UNITED STATES PATENT OFFICE.

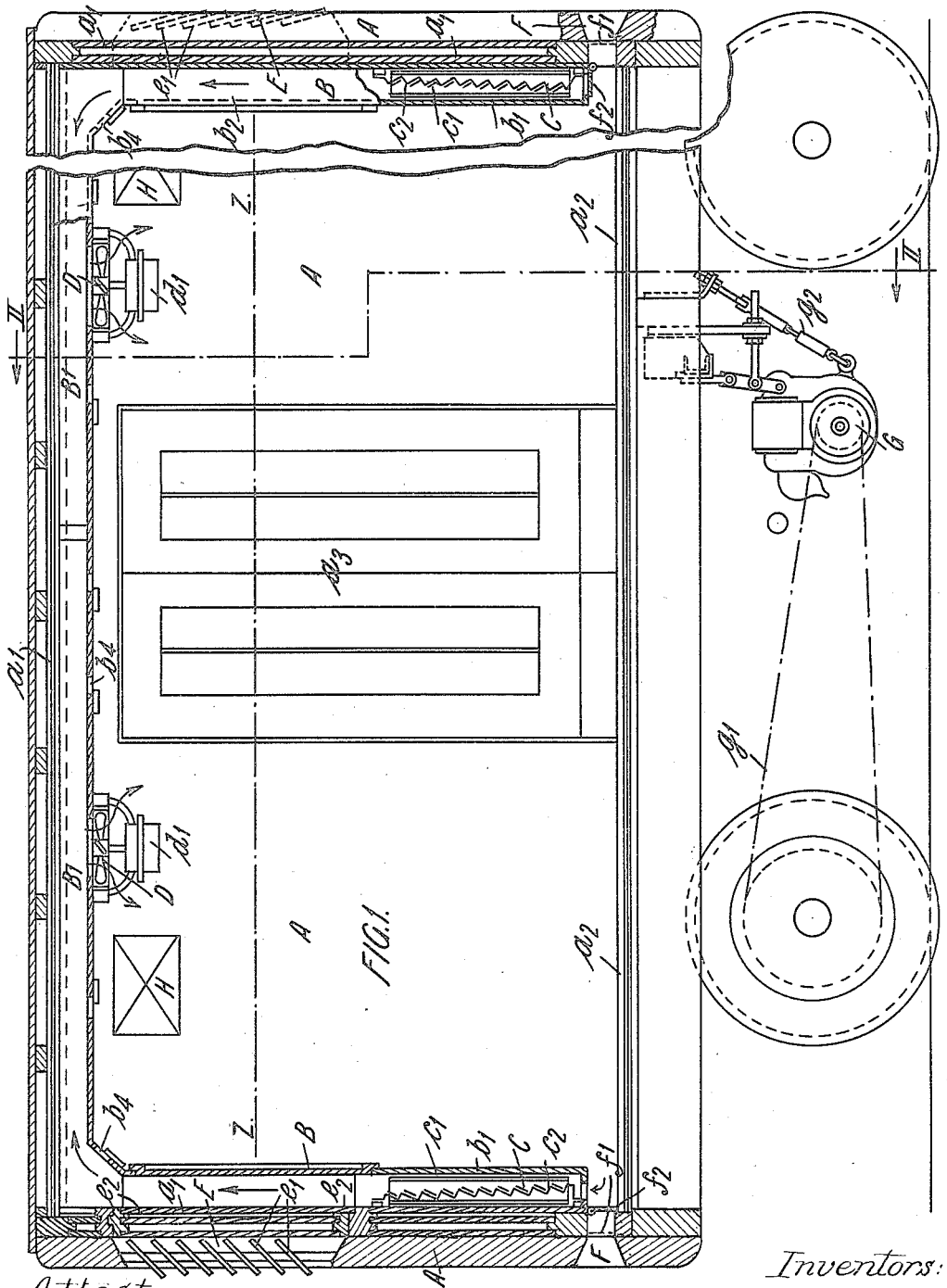

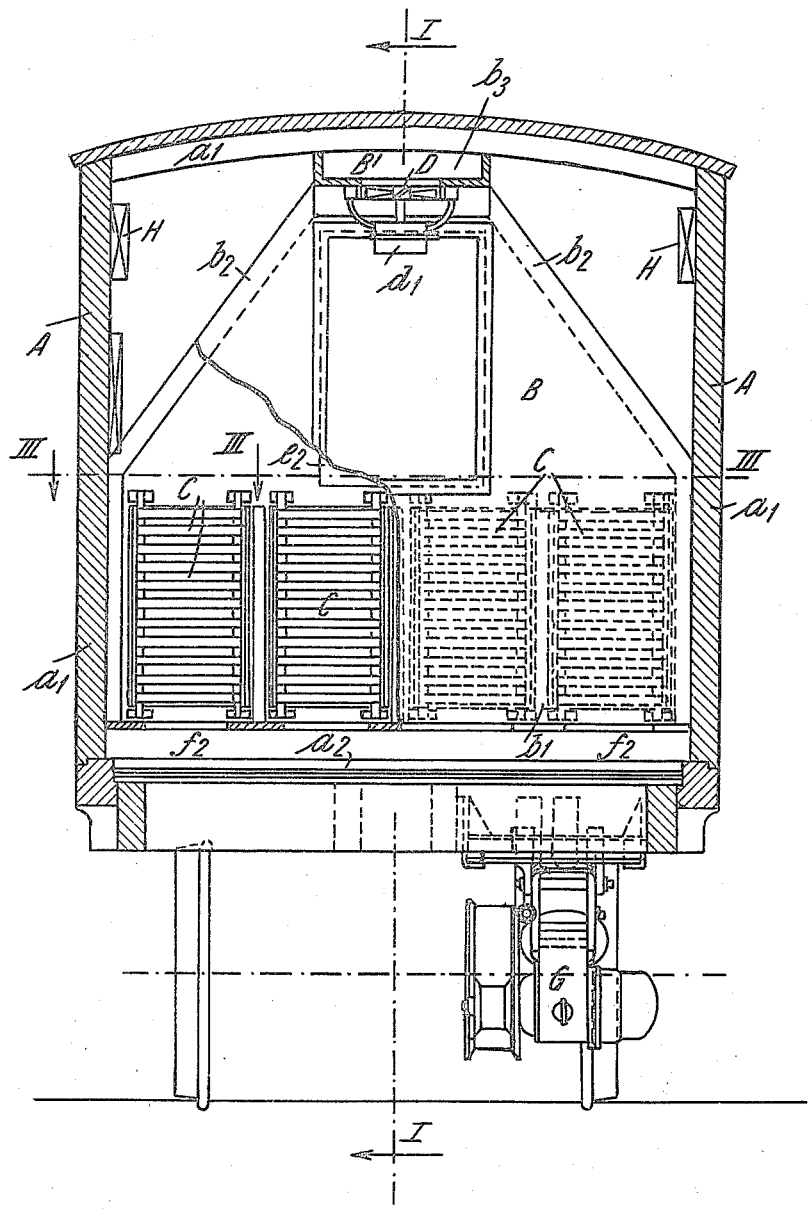

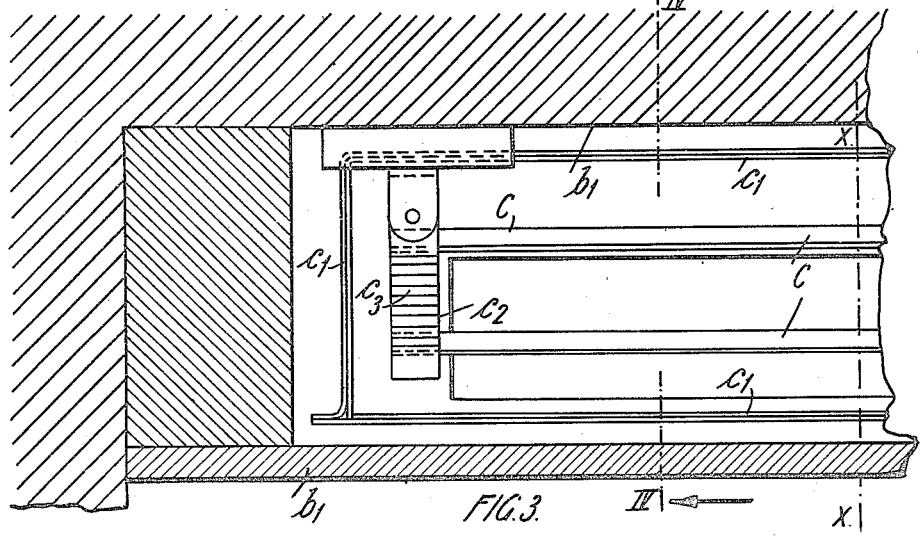
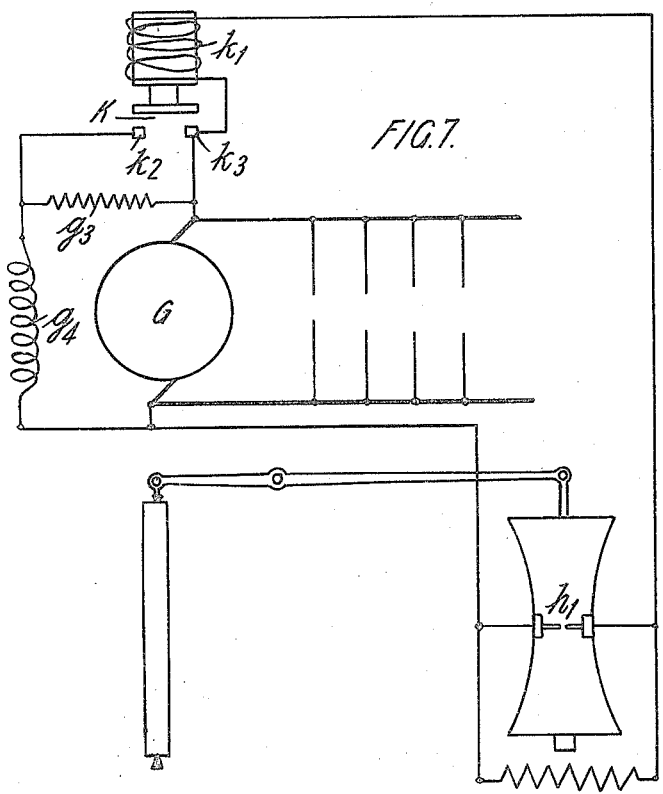 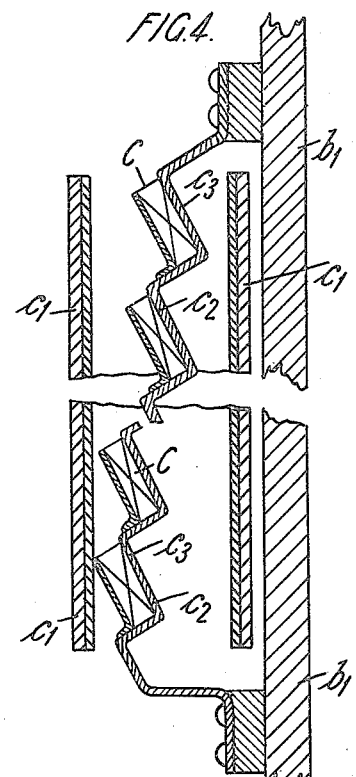

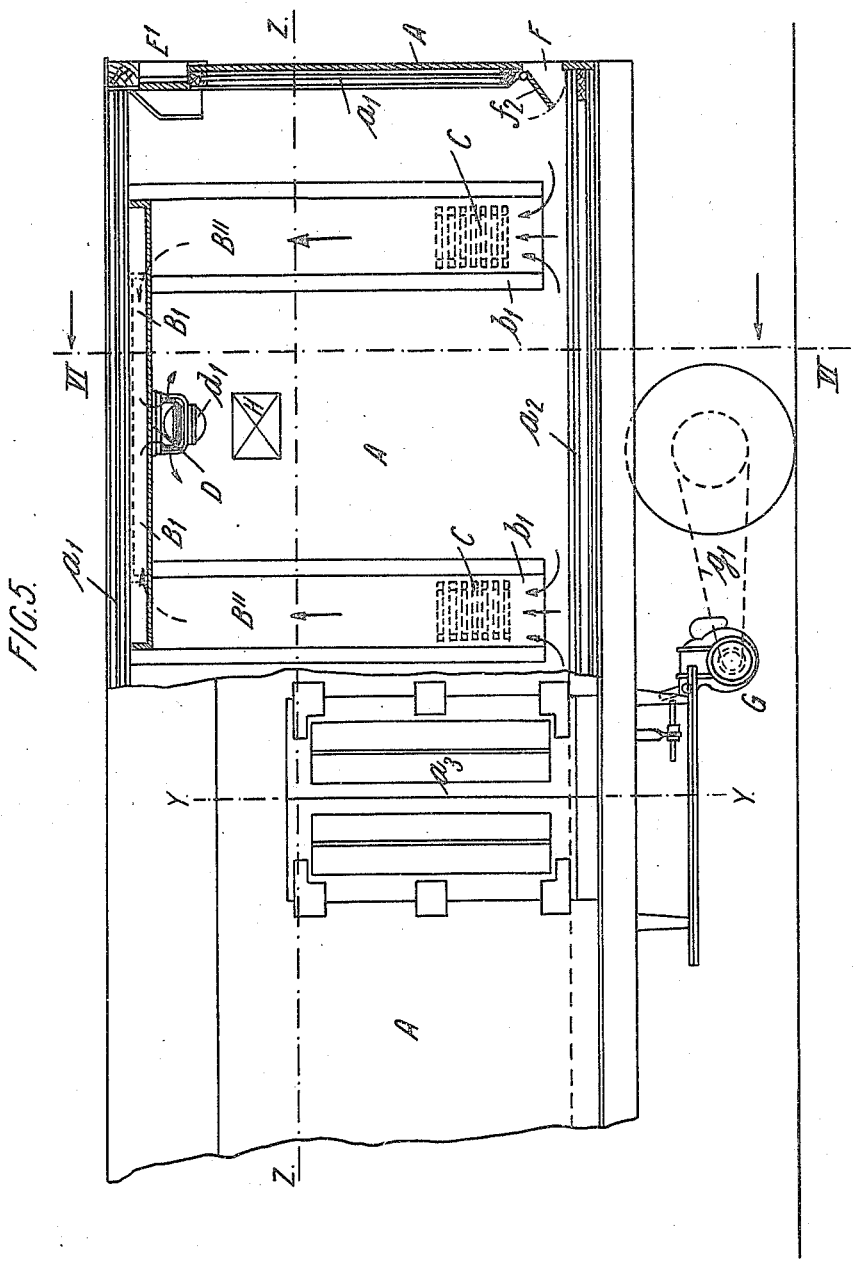

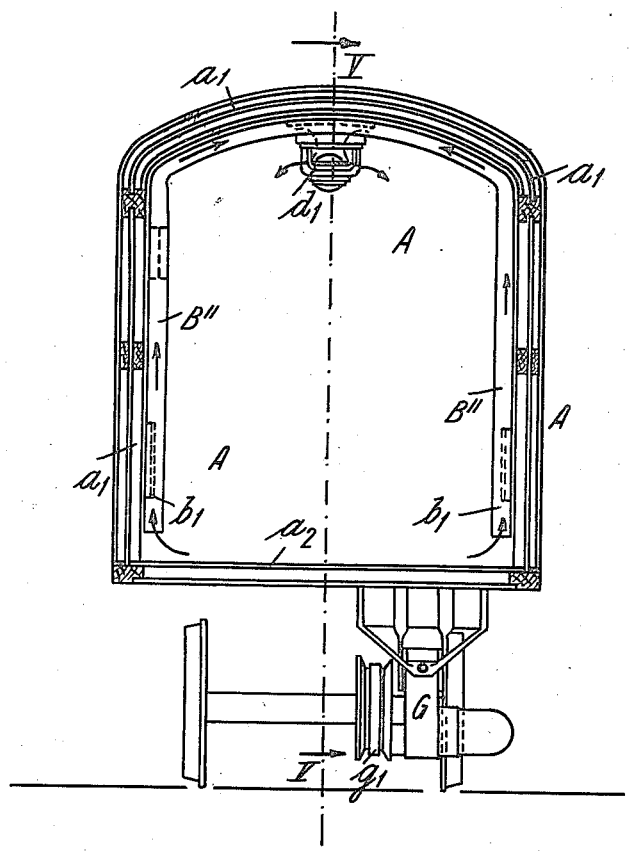

ARTHUR WILLIAM PRIM, OF LIVERPOOL, AND FRANCIS WILLIAM ROPER, OF SHEFFIELD, ENGLAND.

APPARATUS FOR MAINTAINING A UNIFORM TEMPERATURE IN RAILWAY FREIGHT-VANS.

1,228,699.　　　　Specification of Letters Patent.　　Patented June 5, 1917.

Application filed July 28, 1913. Serial No. 781,568.

*To all whom it may concern:*

Be it known that we, ARTHUR WILLIAM PRIM, a subject of the King of Great Britain, and residing in Liverpool, in the county of Lancaster, England, and FRANCIS WILLIAM ROPER, a subject of the King of Great Britain, and residing in Sheffield, in the county of York, England, have invented certain new and useful Improvements in Apparatus for Maintaining a Uniform Temperature in Railway Freight-Vans, of which the following is a specification.

This invention relates to apparatus for maintaining a uniform temperature in railway freight-vans, and the object is to provide a suitably insulated freight-van which shall, as an independent unit, be provided with its own apparatus, actuated by the rotation of the car axle, and adapted to circulate the air within the van, and, when, necessary, to heat the circulating air, the temperature of the van being maintained within prescribed limits by means of thermostats which are arranged to control the heating apparatus and, if necessary, the air circulation.

According to the present invention the energy utilized in the heating devices, the circulating devices and the thermostat is electrical energy generated by a dynamo driven by the van axle; and each van is fitted with its own dynamo, heating devices, circulating devices and thermostats, so that the vans may be made up in special trains or be coupled to ordinary trains; be quite self contained; and not need any special form of coupling or any special connection to the locomotive, being in respect to the rest of the train simply provided with the usual draw-bar and brake couplings.

The vans are thus adapted to pass over various railway systems without in any way interfering with the usual service conditions of such railways.

In carrying out our invention we fit any suitable type of dynamo which is adapted to give a fairly constant potential when driven from the car axle which, of course, will have a variable speed; such types of dynamos are now well known and the potential regulation may be obtained either by an arrangement of differential field windings, armature connections, governor-controlled slack belt driving means, or by combinations of these devices.

The van is carefully insulated against heat transfer either from within or without, and the freight, say fruit, is preferably packed on a perforated false bottom; the space below the false bottom communicates with suitably disposed air trunks through which the air is circulated by electrically operated fans supplied with current from the dynamo; in the air trunks are fitted electric radiators composed of resistances adapted to be heated by current supplied from the dynamo, the current so supplied being regulated by thermostats, controlled by temperature variations within the van, and adapted to actuate, by electrical means, suitable switch or the like controlling gear.

The fans deliver the air into an open space in the van above the freight and the air trunks and openings in the false bottom are so arranged as to provide a uniform circulation of air through all parts of the freight.

A plurality of thermostats are preferably fitted and these may be so connected to the switch gear controlling the radiators that the combined action of all the thermostats is necessary to effect the regulation, so that a small and local variation of temperature, which may affect the one thermostat only, is not operative to affect the control gear; or, of course, each thermostat may control local sections of the radiators.

In some climates at certain seasons it may be necessary to circulate the external air through the vans to keep the temperature below prescribed limits, and in such cases suitable shutters and louvers are provided which by a simple movement alternatively permit the fans to draw air into the space above the freight and discharge it through openings below the false bottom, or of course the flow may be in the reverse direction.

The thermostats are preferably operated by the expansion and contraction of metal parts consequent upon variation of temperature, movement of the necessary extent to actuate electric contacts being obtained by differential expansion or by the curving of a bent strip or by both actions combined.

A suitable type of thermostat for use in connection with our invention is described in an application for a British patent made by us No. 16317 dated July 12th, 1912.

Usually the thermostats are employed to control the radiator regulating gear only, but they may be used also to regulate the speed of the fans and to operate the shutters and louvers so as to automatically change, when the atmospheric conditions need it, the internal heating circulation to an external cooling circulation. The thermostats are adapted to perform these funtions since they depend for their action upon the variation of temperature within the van; for instance, when the temperature tends to fall below that prescribed, the thermostat operates the control gear so as to supply current to the radiators and the fans at such rate as to supply and distribute the necessary heat to the van; when the temperature rises, the current to the radiators is cut-off, and should it rise still further the louvers and shutters are operated, preferably by electrical means, so as to give the external circulation described.

We have in the accompanying drawings illustrated by way of example the application of our invention to two different types of freight cars.

In these drawings Figure 1 is an elevation in section on the line I, I, of Fig. 2, of one type of freight car, Fig. 2 being a corresponding end elevation in section on the line II, II, of Fig. 1; for considerations of space the right hand end of the car is shown broken away, the part omitted is however similar to the corresponding part on the left hand. Fig. 3 is a sectional half plan to an enlarged scale on the line III, III, of Fig. 2 of one of the heating apparatus and its casing; this apparatus being symmetrical about the center line X, X, and Fig. 4 is a vertical section on the line IV, IV, of Fig. 3. Fig. 5 is an elevation partly in section on the line V, V, of Fig. 6, and shows the invention applied to a freight car of the Continental type; this view shows the right hand half of the car, which, except that there need be but the one dynamo, is symmetrical about the center line Y, Y. Fig. 6 is a corresponding end elevation in section on the line VI, VI, of Fig. 5, and Fig. 7 is a diagram of the electrical connections.

A is the freight car or truck, the wheels, springs, axle boxes, buffers, truck gear, and general frame work of which is of the usual construction, and will not be herein further described; the ends, top and sides are insulated with any suitable insulation $a^1$, and the floor $a^2$ of the car may also be insulated or a false bottom may be provided to carry the fruit or other perishable goods. $a^3$ is the door.

The interior of the car is fitted at opposite ends with air trunks B, in the lower portions $b^1$ of which the electrical heating apparatus C is housed, the upper portions $b^2$ are preferably arranged to converge, and at the top to join a longitudinal air trunk B' divided into two parts by a division $b^3$. The air trunk is provided with one or more air circulating devices; in the drawings two fans D are fitted, one for each half of the top air trunk B'; the fans are operated by electric motors $d^1$. A series of adjustable openings $b^4$ is provided in the air trunk which is adjusted to provide the necessary local circulations of air.

At opposite ends of the truck, openings E are provided which are fitted with a series of adjustable louvers $e^1$, which may be used in the summer time when the heating apparatus is not required, to admit the desired volume of cooling air into the air casing, the louvers in the forward end of the truck (the left hand in the drawings) being open so as to give a natural circulation due to the velocity of the truck. In the winter the openings E would be permanently closed by frames $e^2$ fitted with the usual insulation. The openings E as stated lead preferably to the air trunks, but they may, in some cases, be arranged so as to admit air directly into the interior of the truck.

Openings F protected by gratings $f^1$ extend across the bottom of each end of the truck; these openings are controlled by doors $f^2$, which in their lower vertical position (as shown at the left hand end of the truck) close the openings F; and in their upper horizontal position (shown at the right hand end of the truck) close the lower ends of the air trunks $b^1$.

In cold weather the openings E and F are closed; the fans D then draw the air up through the air trunks B where it is heated by contact with the electric heaters C; the air is then drawn through the trunks B' and is distributed into the car through the fans, in the direction indicated by the arrows. The air then passes through the freight (which is loosely packed up to about the level of the line Z, Z), and then returns to the air trunks through the openings in the lower end of the lower parts $b^1$.

In warm weather the louvers $e^1$ of the forward openings E are adjusted to admit a suitable supply of air to the air trunks; this passes into the car from the fan openings, thence through the freight and leaves the car at the rear opening F; some of the air entering at E may pass down the lower part $b^1$ of the forward air casing, and pass to the rear opening F through the lower part of the freight; if it is desired to prevent this latter circulation, the bottom opening of the forward air trunk may be closed by a separate door, as the door $f^2$ in this arrangement is required to close the forward opening F.

The construction of the electric heating apparatus C will be understood from Figs. 3 and 4.

The portion of the air casing $b^1$ in which the heaters are located is lined by a sheet iron asbestos protected casing $c^1$; two zig-zag brackets $c^2$ are fitted at opposite ends of the casing $c^1$, and the heating elements C fit into spring recesses $c^3$, so as to lie obliquely across the air way.

The successive spring recesses are arranged so that the successive heating elements are laterally displaced, so that the series of elements extends across the air way, and the whole of the air comes into contact with the series of heating elements. The heating elements consist preferably of a resistance metal wound on a mica frame protected by mica cover plates forming a unit extending across between the two zig-zag brackets $c^2$, and adapted when supported in the spring recess in these brackets to make electrical contacts which connect them up, say in parallel, across the electrical supply mains.

The current to energize the electric heaters C, and the fans D is provided by the dynamo G.

This dynamo is driven from the car axle, and may be regulated by any of the well known electrical field controlling gears, or belt tension regulating gear may be fitted to maintain an approximately uniform potential for all speeds of the car above the predetermined minimum; such gear may be arranged if necessary to disconnect the dynamo from the circuit when the speed falls below the predetermined minimum, although this is not necessary since the maintenance of a uniform potential is not so important as it would be if lights had to be supplied by the dynamo.

In the drawings the dynamo is shown as being driven from the car axle by the belt $g^1$, and as being pivotally slung from the underside of the truck frame, and provided with belt tension controlling gear $g^2$ which may be of any suitable type.

Current to the heaters and if desired the current to the fans is controlled by a thermostat in accordance with variations of temperature, the thermostat being set to maintain a uniform temperature within the car.

Any suitable form of thermostat and switch gear may be employed, but the preferred form of thermostat and switch gear is that described in the prior application above referred to.

The thermostat and switch are mounted on a suitable panel H located in any convenient position on the side of the car. The thermostat is set so that the contacts $h^1$ (see Fig. 7) are closed so long as the temperature is above the prescribed minimum desired; when these contacts are closed the winding $k^1$ of the swich K is energized, and the contacts $k^2$ and $k^3$ are open so that a non-inductive resistance $g^3$ is interposed in series with the shunt winding $g^4$ of the dynamo G, thus considerably reducing the field excitation.

Should the temperature fall, the contacts $h^1$ open, deënergizing the switch K which then short-circuits the resistance $g^3$, whereupon the field excitation of the dynamo is increased; and a current of suitable magnitude is supplied to the heaters $c$, so that the air circulated by the fans is warmed to a degree sufficient to maintain the desired temperature, should there be an excess of temperature, the contacts $h^1$ again close with the result that the resistance $g^3$ is again interposed.

In Figs. 5 and 6, the arrangement is practically similar to that already described, except that a plurality of air casings B″ in which the heating apparatus is housed are located on the side of the car, and communicate as before with the air casing B′; as before the fans D circulate the air in the direction shown by the arrows. Instead of the louvered openings E, shutter controlled openings E′ may be provided at each end for the admission of cooling air, the openings F being arranged as before at the bottom of the ends. The openings E′ in this arrangement communicate directly with the interior of the car, so that the cool air passes through the freight from the forward opening E′ to the rear opening F without necessarily passing through the air casings.

It will be seen that, where freight has to be conveyed over long distances through different climates, as for instance from the Mediterranean to Northern Europe, the freight may be maintained in good condition by means of the fans and heaters in the cold districts, or by the cooling effect of currents of air induced by the motion of the car in the warmer districts.

The arrangement of the air casings, heaters and fans may of course be modified to suit different types of vans and in some cases the fans may be mechanically driven from the car axles.

As stated each van is provided with its own independent apparatus, but obviously the arrangement may be modified within the limits of our invention by coupling a van such as is herein described to one or more ordinary vans, suitable connections being provided for circulating the warm air through the latter.

Having now fully described our invention, we declare that what we claim, and desire to secure by Letters Patent is:—

A self contained freight car having air casings for the circulation of air within the car so that it passes through the freight contained therein, means located at the end of the car for heating the air as it circulates, fans for circulating the air through the air casings, adjustable means located at the ends of the car and communicating with the atmosphere for ventilating the car, valved air ports communicating with the atmosphere at the ends of the car and in proximity to said heating means, whereby the car may be completely closed and circulation of the heated air effected therein, or it may be ventilated through openings to the outside air.

In testimony whereof we affix our signatures in presence of two witnesses.

ARTHUR WILLIAM PRIM.
FRANCIS WILLIAM ROPER.

Witnesses:
J. E. LLOYD BARNES,
JOSEPH E. HIRST.